Figure 1:
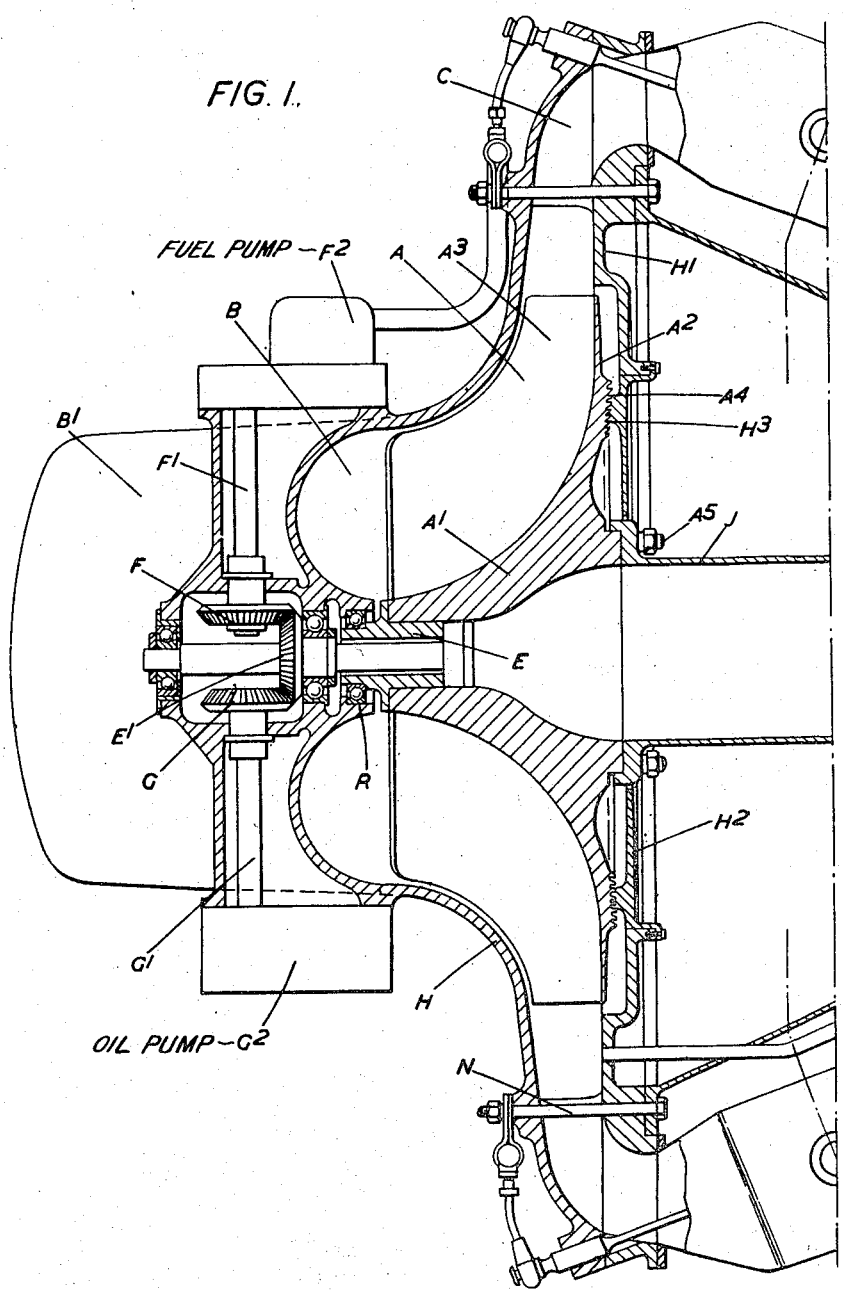

Jan. 25, 1949.  F. B. HALFORD  2,459,935
JET PROPULSION PLANT

Filed July 20, 1943  3 Sheets-Sheet 1

Inventor
Frank Bernard Halford
By
Loyd Hall Sutton
Attorney

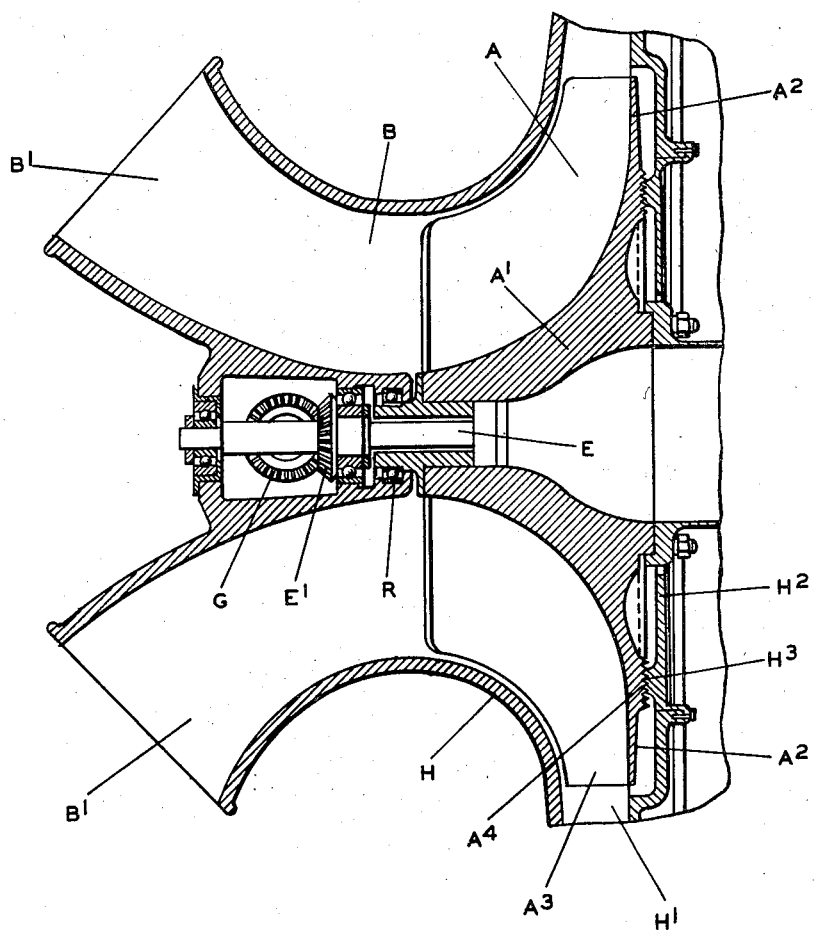

Patented Jan. 25, 1949

2,459,935

UNITED STATES PATENT OFFICE 2,459,935

JET PROPULSION PLANT

Frank Bernard Halford, Edgware, England, assignor to The De Havilland Aircraft Company Limited, Edgware, England, a company of Great Britain Application July 20, 1943, Serial No. 495,518
In Great Britain November 21, 1941

Section 1, Public Law 690, August 8, 1946
Patent expires November 21, 1961

4 Claims. (Cl. 230—116)

This invention relates to apparatus for the propulsion of aircraft though it may be adapted for use on seacraft or on land vehicles. The invention has for its object to effect certain improvements in the construction and arrangement of the compressor and turbine in apparatus of a known type wherein air is delivered by a compressor into a combustion chamber where fuel is burnt in the air and the resultant hot gases first act on a turbine which drives the compressor and then issue into the atmosphere in the form of one or more jets which have a propulsive effect.

According to this invention there is combined with a single-stage compressor with single-sided impeller, a turbine disposed coaxial with the compressor from which it is spaced apart and a tubular shaft connection of substantial diameter extends between the impeller of the compressor and the turbine rotor the bearing for these rotating parts being located beyond the ends of the main tubular shaft member and adjacent respectively to the impeller and the turbine rotor, and there is a non-rotating casing attached at one end to the compressor casing and at its other end carrying the bearing adjacent to the turbine, this casing constituting a rigid connection between the compressor casing and the turbine casing, and thus between the bearings for the impeller and turbine rotor and enclosing the tubular shaft between the impeller and the turbine rotor. This main tubular shaft member has a diameter substantially greater than the diameter of the bearings which lie beyond its ends. It is arranged that the end thrusts of the compressor and turbine are substantially equal and opposite at some specified condition of operation of the apparatus. On the outer face of the disc-like part which forms the delivery end of the impeller of the compressor, which is preferably of the radial delivery type, are a series of alternating annular grooves and ridges. These grooves and ridges are engaged by similar ridges and grooves on an annular plate which may be detachable and constitutes or forms part of the rear or delivery end of the compressor casing. These interengaging ridges and grooves function as a labyrinth packing, but the construction is arranged so that the amount of residual end thrust of the compressor may be varied in order to arrive at the final state wherein the end thrusts of the compressor and turbine balance each other. The number of grooves and ridges on the back of the impeller and the number of the grooves and ridges on the casing plate may be the same or may differ. The plate may be interchanged or altered to adjust the effective radius of the grooves as for instance by removing some of the ridges and thus eliminating some of the grooves as may be necessary.

The rotor of the turbine, which is preferably of the axial flow type, is overhung, that is to say it is carried on a short shaft which projects from one face of the rotor and is connected to the one end of the above-mentioned tubular coupling member which extends between this rotor shaft and the shaft or spindle of the impeller of the compressor. Means are provided whereby air which is bled from the compressor or the inlet thereto is caused to flow past the bearings adjacent to the turbine and thence, in one arrangement, over the one or both faces of the turbine rotor, thence it may pass through openings in the peripheral part of the rotor adjacent to the roots of the blades. In another arrangement the rotor itself may be built up of two separable disc-like parts which when connected together retain the blades at their periphery and have a space between them through which cooling air can flow. This air enters the rotor near or by way of its hub and passes out through lateral openings in or near the roots of the blades.

By means of bevel gearing and radially disposed shafts arranged at the forward end of the impeller shaft, the drive is transmitted to auxiliaries such for example as the pump by means of which fuel is supplied for combustion in the air delivered by the compressor.

Figure 1A:
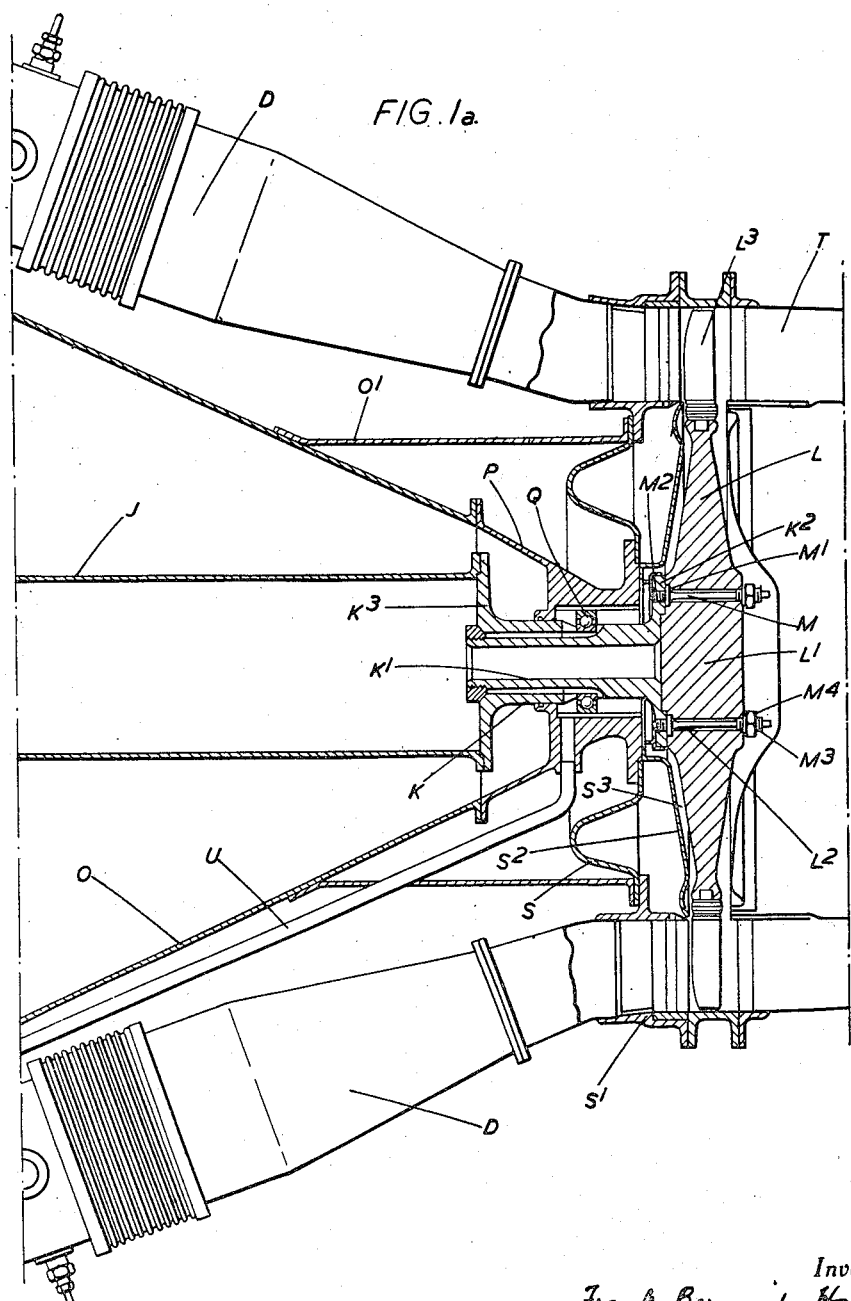

In the accompanying drawing Fig. 1 illustrates in longitudinal sectional elevation and by way of example one end of a construction in which the present invention is embodied, and Fig. 1a similarly illustrates the opposite end.

Figure 2 is a transverse section of the impeller end of the apparatus taken on the main axis thereof in a plane at right angles to the plane in which Figure 1 is taken.

The impeller A, of the radial delivery type, has a single annular entry B to which air is led through two oppositely situated branch passages, indicated at $B^1$, suitably situated on the aircraft. The single stage impeller comprises a hollow boss $A^1$ which is flared smoothly from its intake to its delivery end where the boss merges into a disc-like part $A^2$. The blades of the impeller are integral with the boss and formed by machining from a stamping or forging. These blades have a helicoidal form at their intake parts leading in the case of each blade to a substantially flat portion $A^3$ by which the air is delivered radially in relation to the impeller into an annular chamber C as more fully disclosed in applicant's application of even date herewith, Serial No. 495,519 which issued June 17, 1947, as Patent Number 2,422,615. From this chamber the air passes through a combustion chamber which in the construction illustrated, is built up of a series of separate chambers or compartments D arranged in a conical formation about the axis of the rotor members.

Coupled to the forward end of the impeller boss is a shaft E carrying a bevel wheel $E^1$ which meshes with two bevel wheels F, G on radially extending shafts $F^1$ $G^1$ through which the drive is transmitted in one case to a fuel pump $F^2$ and in another case to other accessory mechanisms such as a pump $G^2$ for lubricating oil or other purpose.

The impeller A and the annular chamber C into which it delivers air is enclosed in a casing comprising a front part H, and annular member $H^1$, through which the air from the impeller passes into the combustion chambers, and an annular back plate $H^2$ which can be detached and changed. On the inner face of this plate $H^2$ are formed a series of annular ridges and grooves $H^3$ which interengage with corresponding ridges and grooves $A^4$ formed on the back or outer face of the disc-like rear end $A^2$ of the impeller. These interengaging grooves and ridges constitute a labyrinth packing. The operative effect of this labyrinth on the end thrust of the impeller may be varied or adjusted to suit certain service conditions of the apparatus. This adjustment may be effected by use of ridges and grooves of different radial positions or removing one or more of the ridges and grooves from the face of the annular plate $H^2$ which is made detachable for alteration or exchange.

By means of bolts $A^5$ the rear end of the impeller boss $A^1$ is coupled to a flange on one end of a tube J of substantial diameter whose other end is similarly connected to an intermediate shaft member K on the rear end of which is mounted the rotor L of the turbine. This intermediate shaft member may be composed of an inner hollow shaft $K^1$ having a flange $K^2$ at one end to which the turbine rotor is bolted, a second hollow shaft K being slipped on to this first shaft and connected thereto by splines. The shaft K carries a flange $K^3$ at its forward end by means of which it is coupled up to the rear end of the tubular connection J to the impeller A.

The hub $L^1$ of the turbine rotor L is connected by bolts M to the flange $K^2$ on the end of the intermediate shaft member $K^1$. To facilitate detachment of these parts a convenient arrangement is to arrange that two of these bolts M, placed diametrically opposite, pass freely through holes $L^2$ in the rotor hub $L^1$ and each bolt towards its forward end has a shoulder or collar $M^1$ and beyond that a threaded part $M^2$ which engages a threaded hole in the shaft flange $K^2$. The outer or rear end $M^3$ of the bolt M is serrated for engagement by a tool by which the whole bolt can be rotated when a nut $M^4$ on the rear end has been removed. This rotation of the forward end of the bolt in the shaft flange $K^2$ will push the rotor hub $L^1$ away from that flange.

Bolts N connect the parts H and $H^1$ of the impeller casing and they also serve to attach to this casing the larger end of a conical casing O which encloses, but with a space between them, the tubular connection J between the impeller and turbine rotor. The smaller and rear end of this casing O is bolted to one end of a connecting piece P which at its other end is attached to the forward side of the casing of the turbine L. This connecting piece encloses the bearing Q at the turbine end of the whole rotor assembly, which comprises the turbine rotor L, the impeller A and the hollow shafting J, K between them. The other bearing R for this rotor assembly is placed, in the present arrangement, at the forward side of the impeller boss $A^1$ as the single inlet B to the compressor is annular. Thus the bearings Q and R for the rotor assembly are spaced well apart with a substantial and rigid connection between the impeller A of the compressor and the rotor L of the turbine. The casing O which encloses the tubular coupling member J itself constitutes a rigid connection between the compressor casing H, $H^1$ with its adjacent bearing R and the bearing Q near the turbine rotor and the casing of the latter. With such an arrangement it is possible to attach the whole apparatus to the aircraft or machine which it is to propel by bolts which connect the impeller casing H, $H^1$ to the aircraft. This part is that portion of the whole apparatus which has the largest diameter. The rear end of the apparatus may then overhang and requires no other rigid attachment but towards the rear end there may be provided yielding supporting members of suitable construction. Thus while there is rigidity as between the main part of the whole apparatus and the aircraft or machine on which it is mounted, there is flexibility between such connection as is provided between the rear part of the propulsive apparatus and the machine which carries it.

With regard to the turbine, its casing on the forward side is conveniently constituted by a circumferentially corrugated plate S which allows for expansion and serves as a connection between the hollow connecting piece P to which the rear end of the conical casing O is attached, and an annular part $S^1$ which carries the nozzles or guide blades of the turbine and to which are also connected and into which open the rear ends of the combustion chambers D. Through these combustion chambers the air delivered by the impeller A passes to the turbine blades $L^3$ suitable arrangements being made for burning fuel in this air. To give additional support for the casing of the turbine and the rear part of the whole apparatus it is preferable to provide a cylindrical member $O^1$ which is attached at one end to the conical casing O and at its other end to the annular part $S^1$. There is thus a rigid connection between the compressor casing H, $H^1$ and the turbine casing S, $S^1$, the part $S^1$ giving support for the rear ends of the combustion chamber compartments D.

The connecting piece P which carries the corrugated plate S also carries between this plate and the turbine rotor L a sheet metal disc $S^2$ which lies a short distance away from the face of that rotor leaving a space $S^3$ through which air can flow outwards from the neighbourhood of the bearings Q to the root portions of the blades $L^3$ at the periphery of the rotor. This air may flow thence through a shallow annular space formed in the inner wall of an annular outlet passage T through which the gases after passing over the turbine blades flow to a single central delivery orifice.

The air which flows over the bearings Q and the rotor L is conveniently led through a pipe U from the annular chamber C into which air is delivered by the impeller A. The rear end of this pipe is carried into the fixed member P within which is the bearing Q.

What I claim as my invention and desire to secure by Letters Patent is:

1. In a jet propulsion apparatus, the combination of a frusto-conical casing disposed with its smaller base to the rear, a comparatively large shaft co-axially mounted for rotation within the casing, a centrifugal impeller mounted on said shaft adjacent the larger base of said casing, an auxiliary casing secured to the larger base of said frusto-conical casing and enclosing said impeller, said auxiliary casing having a central intake and a peripheral discharge cooperating with said impeller, a bearing for said shaft and impeller carried by said auxiliary casing, said shaft having a reduced end section extending forwardly through said bearing and a reduced end section extending rearwardly through the smaller base of said frusto-conical casing, a well formed in said smaller base, and a bearing for said shaft mounted in said well.

2. In a jet propulsion apparatus, the combination of a frusto-conical casing disposed with its smaller base to the rear, a large hollow shaft co-axially mounted for rotation within said casing, a bearing for said shaft co-axially mounted in the smaller base of said casing, said shaft having a reduced end section extending through said bearing, a turbine rotor mounted on said reduced end section adjacent the smaller base of said casing, a centrifugal impeller mounted on said shaft adjacent the larger base of said casing, an auxiliary casing secured to the larger base of said frusto-conical casing and enclosing said impeller, said auxiliary casing having a central intake and a peripheral discharge cooperating with said impeller, a bearing for said shaft and impeller carried by said auxiliary casing, and a hollow journal forming an axial prolongation of said shaft and having a reduced end engaging said last named bearing.

3. In a jet propulsion apparatus, the combination of a frusto-conical casing disposed with its smaller base to the rear, an auxiliary casing secured to the larger base of said frusto-conical casing, a large hollow shaft axially mounted for rotation within said casings, said shaft comprising end sections of smaller diameter upon which it is journalled in bearings supported in the smaller base of said frusto-conical casing and in said auxiliary casing, a turbine rotor mounted on the end section of said shaft adjacent the smaller base of said frusto-conical casing, a centrifugal impeller mounted on the end section of said shaft adjacent the auxiliary casing and between it and the larger base of said frusto-conical casing, said auxiliary casing having a central intake and a peripheral discharge cooperating with said impeller, and bearings carried by said frusto-conical casing and auxiliary casing in which said shaft journal sections are rotatably supported, whereby smooth flow of air through said apparatus is promoted and vibration of said shaft, turbine, impeller and casing under high rotational speeds is minimised.

4. In a jet propulsion apparatus, the combination of a frusto-conical casing disposed with its smaller base to the rear, a large hollow sectional shaft mounted for rotation within said casing, said shaft having end sections of reduced diameter, a centrifugal impeller mounted on said shaft adjacent the larger base of said casing, an auxiliary casing secured to the larger base of said frusto-conical casing and enclosing said impeller, said auxiliary casing having a central intake and a peripheral discharge cooperating with said impeller, a bearing on said shaft carried by said auxiliary casing, said shaft having one end section extending through said bearing, a turbine wheel supported coaxially with said shaft adjacent the smaller base of said frusto-conical casing, and a bearing for said shaft carried by the smaller base of said frusto-conical casing, the other end section of said shaft extending through said last-named bearing and having said turbine wheel mounted thereupon, whereby smooth flow of air through said apparatus is promoted and vibration of said casings and parts rotating at high speed is minimised.

FRANK BERNARD HALFORD.

REFERENCES CITED

The following references are of record in the file of this patent:

UNITED STATES PATENTS

| Number | Name | Date |
| --- | --- | --- |
| 1,031,944 | London | July 9, 1912 |
| 1,244,427 | Coppus | Oct. 23, 1917 |
| 1,328,285 | McClave | Jan. 20, 1920 |
| 1,860,817 | Peterson | May 31, 1932 |
| 2,005,429 | Lichtenstein | June 18, 1935 |
| 2,013,078 | Slocum | Sept. 3, 1935 |
| 2,117,131 | Auger | May 10, 1938 |
| 2,150,670 | Bentley | Mar. 14, 1939 |
| 2,180,168 | Puffer | Nov. 14, 1939 |
| 2,216,731 | Birmann | Oct. 8, 1940 |
| 2,244,467 | Lysholm | June 3, 1941 |
| 2,321,943 | Sampietro | June 15, 1943 |
| 2,326,072 | Seippel | Aug. 3, 1943 |
| 2,360,130 | Heppner | Oct. 10, 1944 |
| 2,364,189 | Buchi | Dec. 5, 1944 |
| 2,429,936 | Kenney et al. | Oct. 28, 1947 |

FOREIGN PATENTS

| Number | Country | Date |
| --- | --- | --- |
| 347,206 | Great Britain | Apr. 16, 1931 |
| 450,196 | Great Britain | July 13, 1936 |